(12) United States Patent
Wang et al.

(10) Patent No.: US 11,125,433 B2
(45) Date of Patent: Sep. 21, 2021

(54) SYSTEM AND METHOD FOR COMBUSTION TUNING

(71) Applicant: GENERAL ELECTRIC COMPANY, Schenectady, NY (US)

(72) Inventors: Honggang Wang, ShangHai (CN); Lihan He, ShangHai (CN); Zhilin Wu, ShangHai (CN); Yao Chen, ShangHai (CN); Wei Zhou, Irvine, CA (US); Guang Xu, Irvine, CA (US); David Kelly Moyeda, Irvine, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1383 days.

(21) Appl. No.: 14/863,946

(22) Filed: Sep. 24, 2015

(65) Prior Publication Data
US 2016/0091203 A1 Mar. 31, 2016

(30) Foreign Application Priority Data
Sep. 26, 2014 (CN) .......................... 201410502627.7

(51) Int. Cl.
*F23N 5/00* (2006.01)
*F23N 1/02* (2006.01)
(Continued)

(52) U.S. Cl.
CPC ................ *F23N 5/00* (2013.01); *F22B 35/00* (2013.01); *F23N 1/022* (2013.01); *F23N 5/006* (2013.01);
(Continued)

(58) Field of Classification Search
CPC ......... F22B 35/00; G05B 13/041; F23N 5/00; F23N 1/022; F23N 5/006; F23N 5/022;
(Continued)

(56) References Cited

U.S. PATENT DOCUMENTS

| 7,010,461 B2 | 3/2006 | Draxton et al. |
| 7,389,151 B2 | 6/2008 | Badami et al. |

(Continued)

FOREIGN PATENT DOCUMENTS

| CN | 101311629 B | 6/2010 |
| CN | 102385356 A | 3/2012 |

OTHER PUBLICATIONS

Docquier et al., "Combustion control and sensors: a review", Progress in Energy and Combustion Science, ScienceDirect, vol. 28, Issue: 2, pp. 107-150, 2002.
(Continued)

*Primary Examiner* — Shogo Sasaki
(74) *Attorney, Agent, or Firm* — Eversheds Sutherland (US) LLP

(57) ABSTRACT

A method for combustion tuning, comprises collecting exhaust parameters indicating combustion status of a boiler by a sensor array; determining whether the exhaust parameters of the boiler match a preset optimization target; and optimizing combustion, if the exhaust parameters do not match the preset optimization target by selecting a model from a model repository based on a current boiler condition, wherein the model corresponds to a relationship between model input variables and the exhaust parameters; determining at least one optimized model input variable of the boiler for realizing the optimization target, based on the selected model; and adjusting actuators of the boiler according to the optimized model input variable.

10 Claims, 3 Drawing Sheets

(51) Int. Cl.
*F23N 5/24* (2006.01)
*F23N 5/02* (2006.01)
*F22B 35/00* (2006.01)
*G05B 13/04* (2006.01)

(52) U.S. Cl.
CPC ............ *F23N 5/022* (2013.01); *F23N 5/242* (2013.01); *G05B 13/041* (2013.01); *F23N 2237/00* (2020.01); *F23N 2237/02* (2020.01)

(58) Field of Classification Search
CPC ... F23N 5/242; F23N 2037/00; F23N 2037/02
See application file for complete search history.

(56) References Cited

U.S. PATENT DOCUMENTS

| | | | |
|---|---|---|---|
| 7,581,945 | B2 | 9/2009 | Widmer et al. |
| 7,838,297 | B2 | 11/2010 | Widmer et al. |
| 8,498,746 | B2 | 7/2013 | James et al. |
| 8,515,582 | B2 | 8/2013 | Jia et al. |
| 8,527,072 | B2 | 9/2013 | Piche |
| 8,544,279 | B2 | 10/2013 | Sappey et al. |
| 2006/0042525 | A1 | 3/2006 | Lefebvre et al. |
| 2006/0155486 | A1 | 7/2006 | Walsh et al. |
| 2007/0168083 | A1 | 7/2007 | Thulen et al. |
| 2007/0240648 | A1* | 10/2007 | Badami ............ F01K 13/02 122/504 |
| 2010/0319592 | A1 | 12/2010 | Dohalick et al. |
| 2011/0300492 | A1 | 12/2011 | Estes et al. |
| 2011/0302901 | A1 | 12/2011 | Xu et al. |
| 2012/0053720 | A1 | 3/2012 | Mathur et al. |
| 2012/0058438 | A1 | 3/2012 | Meerbeck et al. |

OTHER PUBLICATIONS

Jiang et al., "Research on combustion control and heat efficiency's online computing of slime fluidized bed boiler", Intelligent Control and Automation (WCICA), 2012 10th World Congress on, IEEE Xplore, pp. 3412-3416, Jul. 6-8, 2012, Conference Location : Beijing.

First Office Action and search issued in connection with corresponding CN Application No. 201410502627.7 dated Jun. 27, 2017.

A European Search Report and Opinion issued in connection with corresponding EP Application No. 15185120.1 dated Feb. 2, 2016.

* cited by examiner

SYSTEM AND METHOD FOR COMBUSTION TUNING

BACKGROUND

Embodiments of the present invention relate generally to systems and methods for combustion tuning, particular to systems and methods for combustion optimization in boilers.

The power generated by the fossil based boiler accounts for 70% of utility power in China, and around 50% of utility power in the world. Improper control of combustion leads to lower combustion efficiency, higher $NO_x$ and CO concentrations, and reduced reliability. Improper control of combustion also leads to increased slagging and increased boiler tube failures (BTF), which may cause forced power station outages. Eliminating BTF could save the cost of the electric power industry.

Traditional boiler tuning systems rely on the collective bulk exhaust sensor to detect unacceptable levels of emissions. The individual contribution of each burner and/or air injector to the combustion anomaly is not taken into account. Thus, it is difficult for operators to control the combustion of the boiler at an optimal working condition.

On the other hand, the aging and failed actuators in plant may cause the deterioration of the model input signal, and further make the conventional model based optimization system fail to work.

In addition, the boiler's working condition changes in a wide range. Thus, there may be an error between the real output and the model output, which will cause mismatch between the model and boiler status.

Therefore, it is desirable to provide systems and methods to solve the above-mentioned problems.

BRIEF DESCRIPTION

The following summary presents a simplified summary in order to provide a basic understanding of some aspects of the system and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the present invention provides a method for combustion tuning. The method includes collecting exhaust parameters indicating combustion status of a boiler by a sensor array and determining whether the exhaust parameters of the boiler match a preset optimization target. If the exhaust parameters do not match the preset optimization target, the combustion is optimized by: selecting a model from a model repository based on a current boiler condition, wherein the model corresponds to a relationship between model input variables and the exhaust parameters; determining at least one optimized model input variable of the boiler for realizing the optimization target, based on the selected model; and adjusting actuators of the boiler according to the optimized model input variable.

Another aspect of the present invention provides a system for combustion tuning. The system includes a sensor array for collecting exhaust parameters indicating combustion status of a boiler; a trigger for determining whether the exhaust parameters of the boiler match a preset optimization target, and if the exhaust parameters of the boiler do not match the preset optimization target, starting combustion optimization by an optimization system. The optimization system includes a model selector for selecting a model from a model repository based on a current boiler condition, wherein the model corresponds to a relationship between model input variables and the exhaust parameters; an optimizer for determining at least one optimized model input variable of the boiler for realizing the optimization target, based on the selected model; and an adjuster for adjusting actuators of the boiler according to the optimized model input variable.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
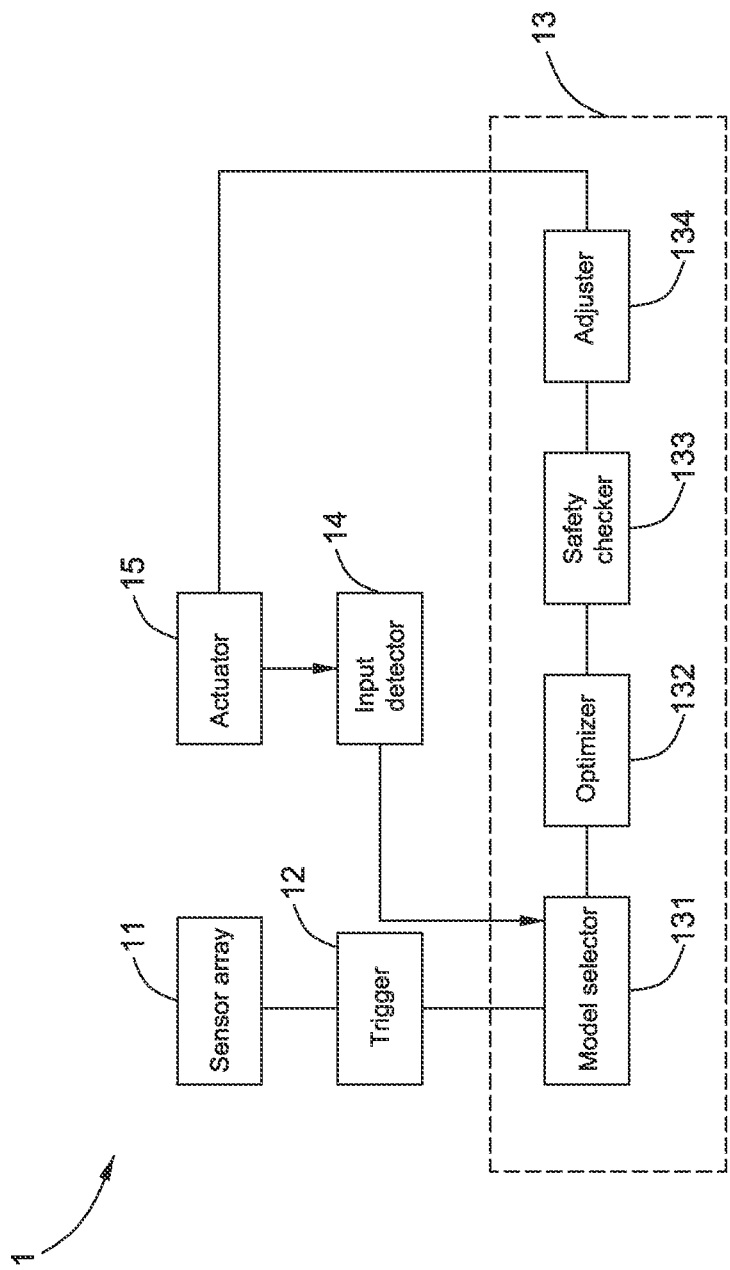
FIG. 1 is a sketch view illustrating a system for combustion tuning in accordance with an exemplary embodiment of the present invention.

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present invention.

Unless defined otherwise, technical and scientific terms used herein have the same meaning as is commonly understood by one of ordinary skill in the art to which the present invention belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

A boiler is a closed vessel in which water or other fluid is heated. The heated or vaporized fluid exits the boiler for use in various processes or heating applications, including central heating, boiler-based power generation, cooking, and sanitation. The source of heat for the boiler is combustion of fuels, such as wood, coal, oil, or natural gas. The boiler includes a furnace for the fuels and air to burn in. Combustion tuning is important to a boiler. A good combustion tuning system can increase combustion efficiency, reduce $NO_x$ and CO concentration in the exhaust, and extend the service life of the boiler. The present invention provides a system for combustion tuning for a boiler.

Referring to FIG. 1, a system 1 for combustion tuning includes a sensor array 11 for collecting parameters of exhaust, i.e., exhaust parameters of a boiler 10, which indicate combustion status of the boiler 10; a trigger 12 for determining whether the exhaust parameters of the boiler 10 match a preset optimization target, and an optimization system 13 for optimizing combustion of the boiler 10. If the exhaust parameters of the boiler 10 do not match the preset optimization target, the trigger starts combustion optimization by an optimization system 13, and then the optimization system 13 starts to work.

The optimization system 13 includes a model selector 131 for selecting a model from a model repository based on a current boiler condition, an optimizer 132 for determining at least one optimized model input variable of the boiler 10 for realizing the optimization target, based on the selected model, and an adjuster 134 for adjusting actuators 15 of the boiler 10 according to the optimized model input variable.

In some embodiments, the sensor array 11 is provided in an exhaust zone of the boiler 10 through which the exhaust travels to exit the furnace. The sensor array 11 generates signals indicative of the parameters of the exhaust exiting the furnace. For example, referring to FIG. 2, the sensor array 11 is provided in a back pass 16 of the boiler 10, with relatively uniform gas flow and little air leakage. In addition, the gas in the back pass 16 is generated after complete combustion. Thus, the exhaust parameters collected by the sensor array 11 has better traceability and reliability than that provided in combustion chamber or after economizer.

The sensor array 11 includes a plurality of sensors 111, which are provided in different positions, and each of the sensors is for measuring one or more exhaust parameters at a position where the sensor is located. The one or more exhaust parameters may be $O_2$ concentration, CO concentration, $NO_x$ concentration, temperature, $CO_2$ concentration, $SO_x$ concentration, $NH_3$ concentration, or a combination thereof, wherein x is an integer independently selected to be 1, 2 or 3. From the exhaust parameters collected by the sensors 111 at different positions, distributions of the gases in the exhaust can be monitored.

Figure 2:
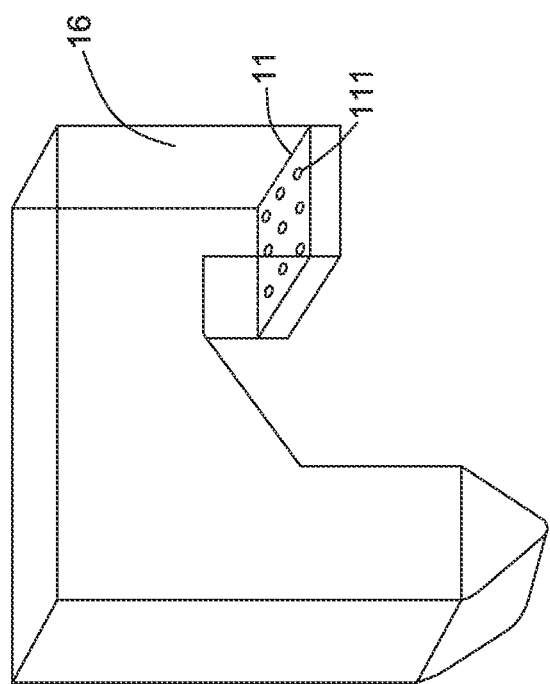
FIG. 2 is a sketch view illustrating a sensor array provided in a back pass of a boiler in accordance with an exemplary embodiment of the present invention.

In some embodiments, the sensors 111 may be uniformly arranged in a cross section of the back pass 16, as illustrated in FIG. 2. Each of the sensors 111 detects a concentration of $O_2$ at the position where the sensor 111 is located. In this way, the system 1 can determine whether $O_2$ in the exhaust has a balance distribution.

In another aspect, the sensor array 11 including the sensors 111 provides a possibility to evaluate the impact of individual actuator 15 and fuel flow on the combustion at different locations in the boiler 10.

The optimization target mentioned above is a target set in advance that the user hopes the boiler to achieve. The optimization target includes distributions of gases in the exhaust and/or other transformations of the exhaust parameters. The distribution may be a uniform distribution, a symmetric distribution or a particular distribution having some areas with high concentration. The transformations of the exhaust parameters may be a summation of the exhaust parameters that surrogates a total quantity of CO, $NO_x$ and others.

For example, the optimization target is supposed as a uniform distribution of CO in the exhaust, which indicates that the boiler is in a balanced combustion. Accordingly, CO concentrations are detected by the sensors 111 at each position, and then CO concentrations at each position are processed by the computer, to generate a CO distribution. In a following step, the CO distribution is compared with the optimization target by the trigger 12 to determine whether to trigger the optimization system 13.

The trigger 12 in the system 1 is for triggering the optimization system 13. The trigger 12 receives the exhaust parameters collected by the sensor array 11, and then determines whether the exhaust parameters match the preset optimization target. If the exhaust parameters of the boiler do not match the preset optimization target, the trigger 12 triggers the optimization system 13 to work. If the exhaust parameters of the boiler match the preset optimization target, the sensor array 11 collects the exhaust parameters again, and then the trigger 12 determines again whether the exhaust parameters match the preset optimization target. The trigger 12 triggers the optimization system 13 until the exhaust parameters do not match the preset optimization target.

Once the optimization system 13 is triggered, the model selector 131 in the optimization system 13 starts to work. The model selector 131 may be a rule-based and/or quantitative selector, which is designed to select an appropriate model from the model repository to fit the current boiler condition. Compared to a single model optimization system, the combustion tuning system described above includes the model repository, and thus is applicable in different boiler conditions.

The boiler condition includes: availability of the model input variables, and operating data of the boiler which include: a load of the boiler, a mill combination, coal types, a boiler oxygen level, or a combination thereof. The availability of the model input variable refers to a count of the available model input variables and a combination of the available model input variables. The model selector 131 selects the model based on the available model input variables, in such a manner that unavailable model input variables are leaved out of model selection, and the reliability of the system 1 for combustion tuning is increased. The strategy of model repository guarantees that combustion tuning system can offer optimization even when the model input variables deteriorates or the boiler condition changes in a wide range. In addition, the model repository can be applicable to different boilers.

The model repository includes plentiful models for different availabilities of the model input variables and different operating data. Each of the models in the model repository corresponds to a relationship between the model input variables, i.e. the parameters of the actuators 15, and the exhaust parameters of the boiler. In some embodiments, linear and nonlinear models are developed to map relationships from the actuators to the exhaust parameters detected by the sensor array 11, for example, $O_2$ and CO concentrations. The models therefore can represent the influence of each individual actuator on combustion at different locations in the boiler.

The operating data of the boiler based on which the model selector 131 selects the model may be a load of the boiler, a mill combination, coal type, a boiler oxygen level, or a combination thereof. The load of the boiler refers to the power output of the boiler. The mill combination refers to different number and combination of mills used in the boiler. Maybe different kinds of mills are combined to provide the coal. The coal type may be brown coal, sub-bituminous coal, bituminous coal, steam coal, anthracite or a combination thereof.

In some embodiments, the system 1 for combustion tuning further includes an input detector 14. The availability of the model input variables based on which the model is selected can be detected by the input detector 14. The input detector 14 determines availability of each model input variable, calculates the count of the available model input variables, and records the combination of the available model input variables. After the availability determination, the input detector 14 sends the availability of the model input variables to the model selector 131.

In some embodiments, the availability of each model input variable can be determined based on data status, change rate, operating range, or a combination thereof. The data status is a state of the model input variable. If the model input variable cannot be read, or the value of the model input variable is not in a general form, the model input variable may be determined to be unavailable. The change rate indicates how fast the model input variable changes in a period of time. If the change rate is higher than a normal value, the model input variable may be determined to be unavailable. The operating range is a normal range of the value of the model input variable. If the value of the model input variable is not in the operating range, the model input variable may be determined to be unavailable.

The model input variables include controllable variables and uncontrollable variables, the controllable variables include damper openings, yaw angles of air inlets, or a combination thereof, and the uncontrollable variables include a boiler load, coal types, mill combinations, a boiler oxygen level, or a combination thereof.

The damper opening of the air inlet decides flow rate of the air, and further decides the air-fuel ratio. The yaw angle of the air inlet decides a direction of the air, and further decides distribution of the air in the combustion chamber. The air inlets include a primary air inlet, a secondary air inlet, and an over fire air (OFA) inlet. Usually, a combination of air and fuel particles enters into the combustion chamber through the primary air inlet. The secondary air inlet and the OFA inlet also provide air.

In some embodiments, the air inlets include four primary air inlets, four secondary air inlets, and four OFA inlets. The four primary air inlets are provided in a first plane, wherein the first plane is horizontal and perpendicular to a central axis of the combustion chamber. The four primary air inlets are respectively provided at four corners of the first plane. Each of the primary air inlets is adjustable in damper opening and yaw angle. The four secondary air inlets are provided in a second plane, wherein the second plane is horizontal and perpendicular to the central axis of the combustion chamber. The four secondary air inlets are respectively provided at four corners of the second plane. Each of the secondary air inlets is adjustable in damper opening and yaw angle. The four OFA air inlets are provided in a third plane, wherein the third plane is horizontal and perpendicular to the central axis of the combustion chamber. The four OFA air inlets are respectively provided at four corners of the third plane. Each of the OFA air inlets is adjustable in damper opening and yaw angle. The first plane, the second plane and the third plane are parallel with each other.

The optimizer 132 is for determining at least one optimized model input variable of the boiler 10 based on the selected model and the optimization target, and further generating optimization instructions. The optimized model input variable is the controllable variable, and may be a damper opening or a yaw angle of one air inlet.

The adjuster 134 is for adjusting the actuators 15 according to the optimized model input variable. The adjuster 134 receives the optimization instructions, and makes the actuators 15 of the boiler 10 act according to the optimization instructions. The actuators 15 may be the air inlets. The damper openings and the yaw angles of the air inlets are adjusted according to the optimization instructions to achieve the optimization target.

In some embodiments, the optimization system 13 further includes a safe checker 133 for determining whether the optimized model input variable is in a safety range before the adjuster 134 adjusts the actuators 15 and before the optimizer 132 generates the optimization instructions. If the optimized model input variable is not in a safety range, the safe checker 133 adjusts the optimized model input variable into the safety range. If the optimized model input variable is in a safety range, the optimizer 132 generates the optimization instructions directly.

In some embodiments, the system 1 for combustion tuning further includes a calibrator for performing online model calibration. The calibrator detects and corrects any model mismatch with the real exhaust parameters detected by the sensor array 11. The calibrator enables a more robust combustion tuning system with longer service time, and hence increases the economic benefits which the conventional method may not achieve.

Figure 3:
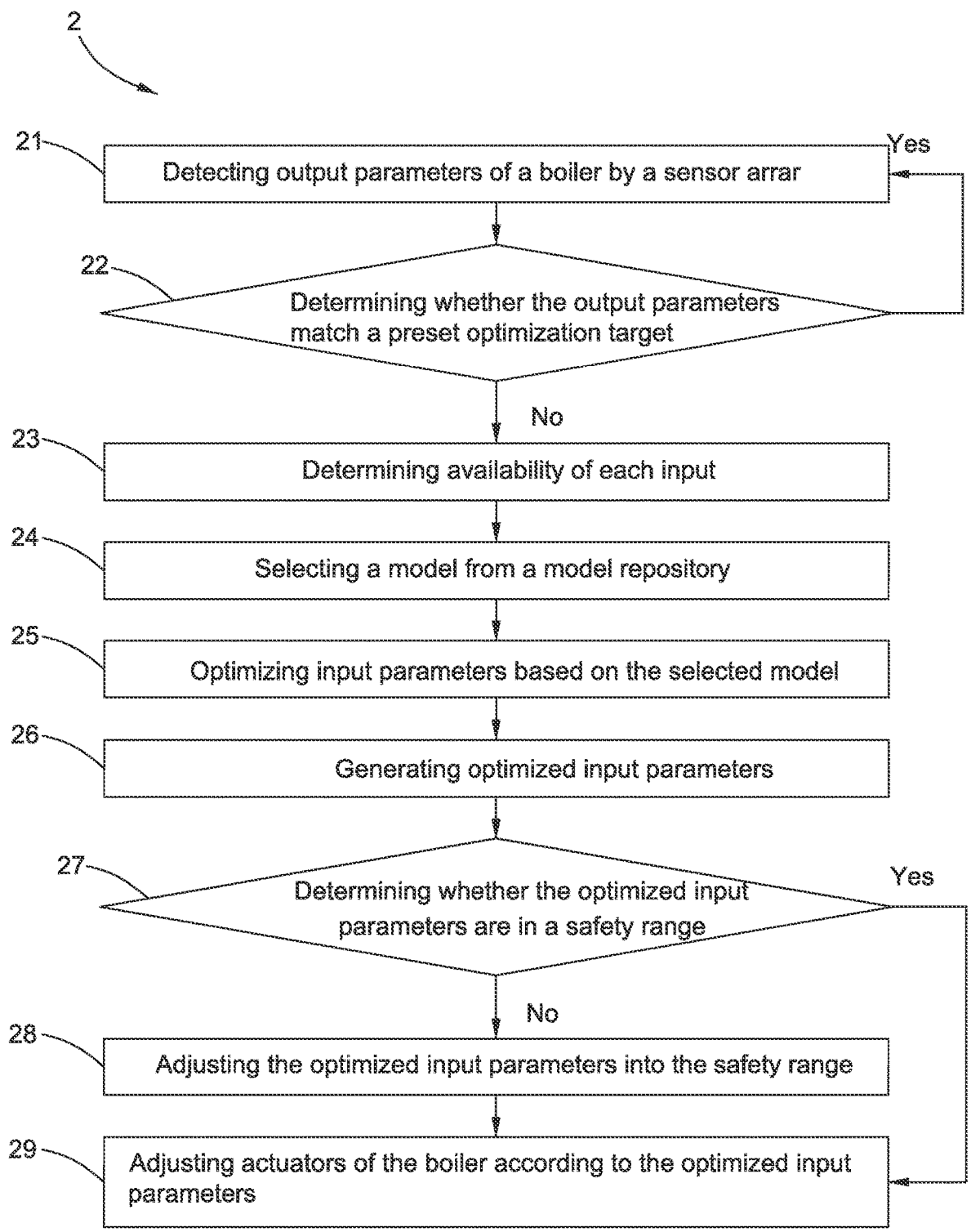
FIG. 3 is a flowchart of a method for combustion tuning in accordance with an exemplary embodiment of the present invention.

FIG. 3 illustrates a flowchart of a method 2 for combustion tuning in accordance with an exemplary embodiment. In the method 2, parameters of exhaust, i.e., exhaust parameters, indicating combustion status of a boiler are collected by a sensor array at step 21.

At step 22, the system determines whether the exhaust parameters of the boiler match a preset optimization target. If the exhaust parameters do not match the preset optimization target, optimizing combustion will be triggered. Then the process goes to step 23. If the exhaust parameters match the preset optimization target, optimizing combustion will not be triggered, and the process goes back to step 21. The step 21 and 22 repeats, until the exhaust parameters are found not match the optimization target.

At step 23, availability of model input variables is determined, i.e. a count of available model input variables is calculated and a combination of available model input variables is recorded. In this way, only available model input variables are taken in account to decide a model, and unavailable model input variables are leaved out. The model input variables are parameters of actuators including air inlets. Aging and fault of the actuators will make the model input variables unavailable. In the conventional technology, the optimization system has only one model. Thus, unavailable model input variables may cause that the model is not applicable anymore, and further make the optimization system fail to work. The solution in present invention significantly reduces the risk brought by the unavailable model input variables.

At step 24, a model is selected from a model repository based on a current boiler condition. The boiler condition includes the availability of the model input variables, and operating data of the boiler which comprise a load of the boiler, a mill combination, coal types, a boiler oxygen level, or a combination thereof. The model corresponds to a relationship between the model input variables and the exhaust parameters.

The model repository includes a plurality of models applicable to different boiler conditions. Each of the models corresponds to one relationship between the model input variables and the exhaust parameters of the boiler.

Compared to the conventional technology, in the embodiments descried above, different models matching different boiler conditions are available. The model repository provides a board range for selecting. A model that matches the current boiler condition best can be selected. For example, the model repository may include linear mathematical models, nonlinear mathematical models, single input-single output (SISO) models, and multiple input-multiple output (MIMO) models. Thus, match degree between the model and the boiler condition can be increased, i.e. the model selected can match the boiler condition better. In some embodiments, the model repository is developed based on field operation data and/or computational fluid dynamics (CFD) simulation data.

At step 25, at least one optimized model input variable of the boiler for realizing the optimization target is determined based on the selected model. The optimized model input variable may be damper openings, yaw angles of air inlets, or a combination thereof. The optimized model input variable may result in optimal exhaust parameters in theory, which match the optimization target. Then the actuators 15 are adjusted according to the optimized model input variable, as illustrated in step 29.

In some embodiments, before the actuators 15 are adjusted, the system determines whether the optimized model input variable is in a safety range, as illustrated in step 27. If the optimized model input variable is not in a safety range, the optimized model input variable is adjusted into the safety range, as illustrated in step 28. If the optimized model input variable is in the safety range, the actuators 15 are directly adjusted according to the optimized model input variable, as illustrated in step 29.

Usually, parameters of the actuators of the boiler are not allowed to change a lot. A large change in a short time may cause safety accident, such as flame extinction or even explosion. The above safe checking course guarantees the optimized model input variable in the safety range, and avoids the safety accident caused by improper change.

In some embodiments, the combustion of the boiler may be optimized more than one times. A few more times of combustion tuning may be needed. After the actuators 15 of the boiler are adjusted as illustrated in step 29, a new circle for combustion tuning may start by repeating the steps 21 to 29.

As will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

What is claimed is:

1. A system for combustion tuning of a boiler, comprising:
   a plurality of adjustable actuators arranged to control a variable input parameter of the boiler;
   an optimization system configured to receive operating data from the boiler indicative of the current boiler condition, the optimation system in signal communication with the plurality of adjustable actuators;
   a sensor array disposed in an exhaust zone of the boiler, configured to measure a parameter indicative of a combustion status of the boiler, the sensor array configured to generate a signal indicative of the value of the measured parameter; and
   a trigger in signal communication with the sensor array and the optimization system, the trigger configured to receive the generated signal and to determine, based on the generated signal; the value of the measured parameter and whether the value of the measured parameter matches a preset target, and, in response to a determination that the determined value of the measured parameter does not match the preset target, the trigger is configured to trigger operation of an optimization system,
   wherein the optimization system comprises:
   a model repository comprising a plurality of selectable models, each model of the plurality of models corresponding to a respective relationship between a value of at least one model input variable and the determined value of the measured parameter;
   a model selector configured to select a model from the plurality of models based on the data indicative of the current boiler condition;
      an optimizer configured to determine the value of the model input variable based on the selected model; and
      an adjuster configured to adjust the actuators of the boiler based on the determined value of the model input variable.

2. The system of claim 1, wherein each sensor of the array is disposed in a different respective location within the exhaust zone of the boiler, and wherein each sensor is configured to measure one or more parameters indicative of a combustion status of the boiler.

3. The system of claim 2, wherein the one or more parameters comprise $O_2$ concentration, CO concentration, $NO_x$ concentration, temperature, $CO_2$ concentration, $SO_x$ concentration, $NH_3$ concentration, or a combination thereof, wherein x is an integer independently selected to be 1, 2 or 3.

4. The system of claim 1, wherein the preset target comprises distributions of gases in the exhaust and/or transformations of the exhaust parameters.

5. The system of claim 1, wherein the data indicative of the boiler condition comprises data indicative of the availability of the measured parameter and data indicative of the availability of operating data indicative of the current boiler condition.

6. The system of claim 5, further comprising an input detector configured to detect the availability of the model input variables, before the model selector selects the model, wherein availability of each model input variable is determined based on a data status, change rate, operating range, or a combination thereof.

7. The system of claim 1, wherein the plurality of models are each applicable to different predetermined boiler conditions.

8. The system of claim 1, further comprising a safe checker in signal communication with the optimizer, and configured to receive a signal indicative of the input variable and determine whether the model input variable is in a predetermined safety range before the adjuster adjusts the actuators, and in response to a determination that the optimized model input variable is not in a safety range, the safe checker is further configured to adjust the model input variable into the safety range, and to provide a signal indicative of the adjusted value of the model input variable to the adjuster.

9. The system of claim 5, wherein the operating data indicative of a current boiler condition comprises a load of the boiler, a mill combination, a coal type, a boiler oxygen level, or a combination thereof.

10. The system of claim 6, wherein the input detector is further configured to provide a signal indicative of the availability of the model input variable to the model selector.

\* \* \* \* \*